(12) United States Patent
Chen et al.

(10) Patent No.: US 11,157,686 B2
(45) Date of Patent: Oct. 26, 2021

(54) TEXT SEQUENCE SEGMENTATION METHOD, APPARATUS AND DEVICE, AND STORAGE MEDIUM THEREOF

(71) Applicant: BEIJING XIAOMI INTELLIGENT TECHNOLOGY CO., LTD., Beijing (CN)

(72) Inventors: Yupeng Chen, Beijing (CN); Liang Shi, Beijing (CN); Shuo Wang, Beijing (CN); Bin Wang, Beijing (CN); Erli Meng, Beijing (CN); Qun Guo, Beijing (CN)

(73) Assignee: BEIJING XIAOMI INTELLIGENT TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 16/861,295

(22) Filed: Apr. 29, 2020

(65) Prior Publication Data
US 2021/0141998 A1    May 13, 2021

(30) Foreign Application Priority Data
Nov. 11, 2019 (CN) .......................... 201911097121.1

(51) Int. Cl.
*G06F 40/169* (2020.01)
*G06F 40/284* (2020.01)

(52) U.S. Cl.
CPC .......... *G06F 40/169* (2020.01); *G06F 40/284* (2020.01)

(58) Field of Classification Search
CPC ...... G06F 40/169; G06F 40/284; G06F 17/18; G06K 9/6288
USPC ............................................................ 704/9
See application file for complete search history.

(56) References Cited

U.S. PATENT DOCUMENTS
2004/0243408 A1   12/2004   Gao et al.

FOREIGN PATENT DOCUMENTS
CN          108334492 A        7/2018

OTHER PUBLICATIONS

Extended European Search Report dated Nov. 20, 2020 in European Patent Application No. 20177416.3, 10 pages.
(Continued)

*Primary Examiner* — Thierry L Pham
(74) *Attorney, Agent, or Firm* — Oblon, McClelland, Maier & Neustadt, L.L.P.

(57) ABSTRACT

The present disclosure, belonging to the technical field of natural language processing, provides a text sequence segmentation method. The method can include acquiring n segmentation sub-results of the text sequence, the n segmentation sub-results being acquired by segmenting the text sequence by n segmentation models, and processing the n segmentation sub-results by a probability determination model branch in a result combination model to acquire a segmentation probability of the each segmentation position. The method can further include processing the segmentation probability of the each segmentation position by an activation function in the result combination model to acquire a segmentation result of the text sequence. According to the present disclosure, using each segmentation position in the text sequence as a unit, segmentation results of a plurality of segmentation models are combined, such that the accuracy of segmentation of a new text can be improved.

20 Claims, 4 Drawing Sheets

(56) References Cited

OTHER PUBLICATIONS

Jason Wei, et al., "EDA: Easy Data Augmentation Techniques for Boosting Performance on Text Classification Tasks," International Conference on Learning Representations; Aug. 25, 2019, 9 pages.
Ji Ma, et al., "State-of-the-art Chinese Word Segmentation with Bi-LSTMs," Proceedings of the 2018 Conference on Empirical Methods in Natural Language Proceeding, Association for Computational Linguistics, 2018, pp. 4902-4908.

TEXT SEQUENCE SEGMENTATION METHOD, APPARATUS AND DEVICE, AND STORAGE MEDIUM THEREOF

CROSS-REFERENCE TO RELATED APPLICATION

This application claims priority to Chinese Patent Application No. 201911097121.1, filed on Nov. 11, 2019 and entitled "TEXT SEQUENCE SEGMENTATION METHOD AND APPARATUS, AND STORAGE MEDIUM THEREOF", the entire contents of which are incorporated herein by reference.

TECHNICAL FIELD

The present disclosure relates to the technical field of natural language processing, and in particular, relates to a text sequence segmentation method, apparatus and device, and a storage medium thereof.

BACKGROUND

In natural language processing (NLP) tasks with respect to Chinese, generally texts are processed by using a word as a unit. As such, segmentation of text sequences of Chinese is a fundamental task in the Chinese natural language processing.

SUMMARY

The present disclosure provides a text sequence segmentation method, apparatus and device, and a storage medium thereof. In a first aspect of embodiments of the present disclosure, a text sequence segmentation method is provided. The method can include receiving an input text sequence, and segmenting the text sequence by n segmentation models, respectively, and acquiring n segmentation sub-results of the text sequence, the segmentation sub-result indicating a segmentation state at each segmentation position in the text sequence, the segmentation position being a position between each two adjacent characters in the text sequence, the segmentation state indicating whether segmentation is performed at a corresponding segmentation position, n being an integer greater than or equal to 2. Further, the method can include processing the n segmentation sub-results by a probability determination model branch in a result combination model to acquire a segmentation probability of each segmentation position, and processing the segmentation probability of each segmentation position by an activation function in the result combination model to acquire a segmentation result of the text sequence.

In a possible implementation, the segmentation sub-result can include a state value of each segmentation position in the text sequence, the state value being intended to indicate a segmentation state at a corresponding segmentation position. Further, processing the n segmentation sub-results by the probability determination model branch in the result combination model to acquire the segmentation probability of each segmentation position can include acquiring the segmentation probability of each segmentation position by the probability determination model branch according to the state values corresponding to each segmentation position in the n segmentation sub-results.

Further embodiments can provides that the probability determination model branch includes weights of the n segmentation models. Acquiring the segmentation probability of each segmentation position by the probability determination model branch according to the state values corresponding to each segmentation position in the n segmentation sub-results can also include acquiring a segmentation weight value of each segmentation position by the probability determination model branch according to the state values corresponding to each segmentation position in the n segmentation sub-results and the weights of the n segmentation models, and normalizing the segmentation weight value of each segmentation position by the probability determination model branch to acquire the segmentation probability of each segmentation position. The result combination model is a machine learning model trained according to n segmentation sub-result samples of a text sequence sample and an annotation segmentation result of the text sequence sample, the n segmentation sub-result samples are acquired by segmenting the text sequence sample by the n segmentation models, and the weights of the n segmentation models are model parameters of the result combination model.

Additionally, acquiring the segmentation weight value of each segmentation position by the probability determination model branch according to the state values corresponding to each segmentation position in the n segmentation sub-results and the weights of the n segmentation models can include multiplying each of the state values corresponding to a target segmentation position in the n segmentation sub-results by the weight of the corresponding segmentation model, respectively, and summing multiplication results to acquire the segmentation weight value of the target segmentation position, the target segmentation position being any segmentation position in the segmentation positions.

In a possible implementation, that the state value is 0, it indicates that no segmentation is performed at the corresponding segmentation position, and if that the state value is 1, it indicates that segmentation is performed at the corresponding segmentation position. Further, acquiring the segmentation probability of each segmentation position according to the state values corresponding to each segmentation position in the n segmentation sub-results can include averaging the state values corresponding to the target segmentation position in the n segmentation sub-results to acquire the segmentation probability of the target segmentation position, where the target segmentation position is any segmentation position in the segmentation positions.

In alternative embodiments, processing the segmentation probability of each segmentation position by the activation function in the result combination model to acquire the segmentation result of the text sequence can include binarizing the segmentation probability of each segmentation position by the activation function to acquire a binarized sequence of the text sequence, and acquiring the segmentation result of the text sequence according to the binarized sequence.

In a possible implementation, the method can further include training the segmentation model by the text sequence and the segmentation result of the text sequence.

Additional aspect of the present disclosure can provide a text sequence segmentation apparatus. The apparatus can include a segmentation result acquiring module that is configured to acquire n segmentation sub-results of the text sequence. The n segmentation sub-results being acquired by segmenting the text sequence by n segmentation models, the segmentation sub-result indicating a segmentation state at each segmentation position in the text sequence, the segmentation position being a position between each two adjacent characters in the text sequence, the segmentation state indicating whether segmentation is performed at a corresponding segmentation position, where n is an integer greater than or equal to 2. Additionally, the apparatus can include a probability acquiring module that is configured to process the a segmentation sub-results by a probability determination model branch in a result combination model to acquire a segmentation probability of each segmentation position, and a result acquiring module that is configured to process the segmentation probability of each segmentation position by an activation function in the result combination model to acquire a segmentation result of the text sequence.

In a possible implementation, the segmentation sub-result includes a state value of each segmentation position in the text sequence, the state value being intended to indicate a segmentation state at a corresponding segmentation position. Further, the probability acquiring module is configured to acquire the segmentation probability of each segmentation position by the probability determination model branch according to the state values corresponding to each segmentation position in the n segmentation sub-results.

In a possible implementation, the probability determination model branch includes weights of the n segmentation models. Further, the probability acquiring module can include weighing sub-module that is configured to acquire a segmentation weight value of each segmentation position by the probability determination model branch according to the state values corresponding to each segmentation position in the n segmentation sub-results and the weights of the n segmentation models. Also, the module can include a normalizing sub-module that is configured to normalize the segmentation weight value of each segmentation position by the probability determination model branch to acquire the segmentation probability of each segmentation position. The result combination model is a machine learning model trained according to n segmentation sub-result samples of a text sequence sample and an annotation segmentation result of the text sequence sample, the n segmentation sub-result samples are acquired by segmenting the text sequence sample by the n segmentation models, and the weights of the n segmentation models are model parameters of the result combination model.

In a possible implementation, the weighing sub-module is further configured to multiply the state values corresponding to a target segmentation position in the n segmentation sub-results by the weight of the corresponding segmentation sub-model, respectively, and sum multiplication results to acquire the segmentation weight value of the target segmentation position, the target segmentation position being any segmentation position in the segmentation positions.

In a possible implementation, that the state value is 0 indicates that no segmentation is performed at the corresponding segmentation position, and that the state value is 1 indicates that segmentation is performed at the corresponding segmentation position. The probability acquiring module is further configured to average the state values corresponding to the target segmentation position in the n segmentation sub-results to acquire the segmentation probability of the target segmentation position, wherein the target segmentation position is any segmentation position in the segmentation positions.

In a possible implementation, the result acquiring module can include a binarizing sub-module that is configured to binarize the segmentation probability of each segmentation position by the activation function to acquire a binarized sequence of the text sequence, and a result acquiring sub-module that is configured to acquire the segmentation result of the text sequence according to the binarized sequence.

In a possible implementation, the apparatus can further include a training module that is configured to train the segmentation model by the text sequence and the segmentation result of the text sequence.

In the third aspect of embodiments of the present disclosure, a text sequence segmentation device is provided. The device includes a processor and a memory configured to store at least one instruction which is capable of being executed by the processor. The processor can be configured to receive an input text sequence, and segment the text sequence by n segmentation models, respectively; and acquire n segmentation sub-results of the text sequence, the segmentation sub-result indicating a segmentation state at each segmentation position in the text sequence, the segmentation position being a position between each two adjacent characters in the text sequence, the segmentation state indicating whether segmentation is performed at a corresponding segmentation position, n being an integer greater than or equal to 2. The processor can further be configured to process the n segmentation sub-results by a probability determination model branch in a result combination model to acquire a segmentation probability of each segmentation position, and process the segmentation probability of each segmentation position by an activation function in the result combination model to acquire a segmentation result of the text sequence.

In other embodiments of the present disclosure, a computer device is provided. The computer device includes a processor and a memory. The memory stores at least one instruction, at least one program, and a code set or construction set. The at least one instruction, the at least one program, and the code set or instruction set are loaded and executed by the processor to perform the text sequence segmentation method according to the first aspect or any optional solution of the first aspect.

In further embodiments of the present disclosure, a non-transitory computer-readable storage medium is provided. The storage medium stores at least one instruction, at least one program, and a code set or construction set. The at least one instruction, the at least one program, and the code set or instruction set are loaded and executed by the processor to perform the text sequence segmentation method according to the first aspect or any optional solution of the first aspect.

Embodiments of the present disclosure may achieve several beneficial effects. For example, a single text sequence is segmented by a plurality of segmentation models to acquire n segmentation sub-results, state values corresponding to each segmentation position in the n segmentation sub-results are combined to acquire a segmentation probability of each segmentation position in the text sequence, and then a segmentation result of the text sequence is determined in combination with the segmentation probability of each segmentation position. That is, by using each segmentation position in the text sequence as a unit, segmentation results of a plurality of segmentation models are combined, such that the accuracy of segmentation of a new text sequence is improved.

It should be understood that both the foregoing general description and the following detailed description are exemplary and explanatory only and are not intended to limit the present disclosure.

BRIEF DESCRIPTION OF THE DRAWINGS

The accompanying drawings, which are incorporated in the specification and constitute a part of the specification, show embodiments of the present disclosure. The drawings along with the specification explain the principles of the present disclosure.

DETAILED DESCRIPTION

Figure 1:
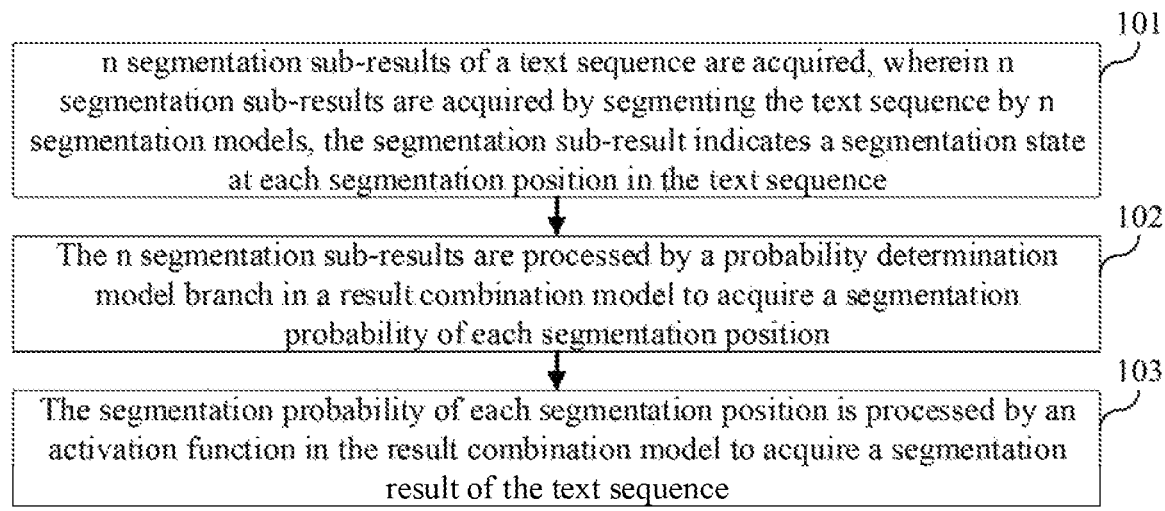
FIG. 1 is a flowchart of a text sequence segmentation method according to an exemplary embodiment of the present disclosure.

Exemplary embodiments will be described in detail herein, examples of which are illustrated in the accompanying drawings. The following description refers to the accompanying drawings in which the same numbers in different drawings represent the same or similar elements unless otherwise indicated. The implementations set forth in the following exemplary embodiments do not represent all implementations consistent with the present invention. Rather, they are merely examples of devices and methods consistent with certain aspects of the present invention as detailed in the appended claims.

It should be understood that the term "several" means one or more than one, and the term "a plurality of" means two or more than two. The term "and/or" is merely an association relationship for describing associated objects, which represents that there may exist three types of relationships, for example, A and/or B may represent three situations: only A exists, both A and B exist, and only B exists. In addition, the character "/" herein generally represents an "or" relationship between associated objects before and after the character.

The technical solutions according to the present disclosure may be applicable to artificial intelligence (AI) scenarios, for example, a scenario of Chinese segmentation training corpus automatic annotation based on A, or a scenario of text sequence segmentation based on AI. For ease of understanding, hereinafter, terms and application scenarios involved in the embodiments of the present disclosure are briefly introduced.

1) Artificial Intelligence (AI)

AI is a new scientific technology for studying and developing theorems, methodologies, techniques, and application systems that are capable of simulating, extending and expanding human intelligence, which is a branch of computer science. The AI technology attempts to perceive the essence of intelligence, and culture a new technique capable of taking actions or reactions like human intelligence. AI has been extensively applied in robots, language recognition, image recognition, natural language processing, automatic driving, and the like fields.

2) Natural Language Processing (NLP)

Natural language processing is an important subject in the fields of computer science and artificial intelligence. Natural language processing studies various theorems and methodologies capable of implementing effective communications between humans and computers with natural languages, which is a science that combines linguistics, computer science and mathematics.

In Chinese handwriting, the texts are generally spaced apart by punctuations, unlike English handwriting in which texts are spaced apart by words as units. Therefore, segmentation of the text sequences in Chinese is fundamental in natural language processing tasks in Chinese.

Chinese segmentation refers to segmenting a Chinese text sequence (composed of Chinese character) into one or more individual words. That is, words are spaced apart by using spacers like English. Chinese segmentation tasks are generally performed by segmentation models. With respect to the Chinese segmentation tasks, the segmentation models in related arts generally achieve an accuracy higher than 90% or more, and the key to implementation of the segmentation tasks has already been transformed from model optimization to corpus collection.

However, high-quality Chinese annotation corpora in the industry are far from insufficient, and relate to narrower scopes. In addition, Chinese words are updated quickly, and the insufficient and outdated corpora may fail to accommodate the training requirements of the segmentation models in various application fields.

Since annotation of new corpora needs to be carried out by many linguistics experts with a large amount of time. As such, the accuracy of the acquired annotated corpora is high but the acquisition efficiency is low, and thus the cost is extremely high. Expansion of the current training corpora is implemented based on easy data augmentation (EDA).

The easy data augmentation refers to processing the data by minor adjustment where the data is insufficient, and creating equivalent data without changing the meanings of the original data, such that the segmentation models may learn a single data from a plurality of perspectives, and over-fitting is prevented.

In the related art, the easy data augmentation may be defined as including: synonyms replace (SR), randomly insert (RI), randomly swap (RS) and randomly delete (RD).

The synonyms replace SR refers to randomly extracting n words from a sentence (stop words are not considered), and replacing the extracted n words by randomly extracted synonyms of the words from a synonyms dictionary. For example, a sentence "She is very beautiful" may be replaced by "She is quite pretty."

The randomly insert RI refers to randomly extracting a word from a sentence (stop words are not considered), and randomly selecting a synonym of the word from a synonyms dictionary, and randomly inserting the selected synonym to the sentence. This process may be repeated for n times. For example, a sentence "She is very beautiful" may be changed to "She is pretty very beautiful."

The randomly swap RS refers to randomly selecting two words and exchanging the positions of the two words. This process may be repeated for n times. For example, a sentence "She is very beautiful" may be changed to "She is beautiful very."

The randomly delete RD refers to randomly deleting a word in a sentence based on a predefined probability. For example, a sentence "She is very beautiful" may be changed to "She is beautiful."

By the above easy data augmentation, the trained segmentation models may be more robust. In addition, by training the segmentation models trained by less manually annotated data in combination with easy data augmentation, the training effects originally achieved by training the segmentation models by more manually annotated data may be achieved.

However, since major errors in the segmentation tasks are from out of vocabulary (OOV). The out of vocabulary refers to a collection of words that are not recorded in the segmentation words but needs to be segmented, including varieties of proper nouns (names of persons, names of places, names of companies and the like), abbreviations, new words, and the like. The easy data augmentation fails to solve the problem of OOV. Consequently, the trained segmentation models fail to correctly segment the text sequences in new texts. That is, the training corpora obtained by the easy data augmentation only makes few improvements on the training effect of the Chinese segmentation models.

In the embodiments hereinafter of the present disclosure, a technical solution of segmenting a single text sequence by a plurality of trained segmentation models to obtain a more accurate segmentation result. The segmentation result may be used as an annotation result of the text sequence, used as a training corpus of the segmentation models, or may be used as a segmentation result of the text sequence for application of subsequent natural language processing.

The text sequence segmentation solution according to the embodiments of the present disclosure may be executed by a computer device. The computer device may be a device having calculation capabilities. For example, the computer device may be a personal computer, a notebook computer, a personal workstation, a server, or the like.

FIG. 1 is a flowchart of a text sequence segmentation method according to an exemplary embodiment. The text sequence segmentation method may be executed by a computer device. As illustrated in FIG. 1, the text sequence segmentation method may include the following steps.

In step 101, n segmentation sub-results of a text sequence are acquired, wherein n segmentation sub-results are acquired by segmenting the text sequence by n segmentation models, the segmentation sub-result indicates a segmentation state at each segmentation position in the text sequence, the segmentation position is a position between each two adjacent characters in the text sequence, and the segmentation state indicates whether segmentation is performed at a corresponding segmentation position. The value of n can be set to an integer greater than or equal to 2.

The computer device may receive an input text sequence, and segment the text sequence by n segmentation models, respectively.

In step 102, the n segmentation sub-results are processed by a probability determination model branch in a result combination model to acquire a segmentation probability of each segmentation position.

In step 103, the segmentation probability of each segmentation position is processed by an activation function in the result combination model to acquire a segmentation result of the text sequence.

The segmentation sub-result can include a state value of each segmentation position in the text sequence, the state value being intended to indicate a segmentation state at a corresponding segmentation position. Processing the n segmentation sub-results by the probability determination model branch in the result combination model to acquire the segmentation probability of each segmentation position can include acquiring the segmentation probability of each segmentation position by the probability determination model branch according to the state values corresponding to each segmentation position in the n segmentation sub-results.

In a possible implementation, the probability determination model branch includes weights of the n segmentation models. Acquiring the segmentation probability of each segmentation position by the probability determination model branch according to the state values corresponding to each segmentation position in the n segmentation sub-results can include acquiring a segmentation weight value of each segmentation position by the probability determination model branch according to the state values corresponding to each segmentation position in the n segmentation sub-results and the weights of the n segmentation models, and normalizing the segmentation weight value of each segmentation position by the probability determination model branch to acquire the segmentation probability of each segmentation position. The result combination model is a machine learning model trained according to n segmentation sub-result samples of a text sequence sample and an annotation segmentation result of the text sequence sample, the n segmentation sub-result samples are acquired by segmenting the text sequence sample by the n segmentation models, and the weights of the n segmentation models are model parameters of the result combination model.

Further, acquiring the segmentation weight value of each segmentation position by the probability determination model branch according to the state values corresponding to each segmentation position in the n segmentation sub-results and the weights of the n segmentation models include can include multiplying each of the state values corresponding to a target segmentation position in the n segmentation sub-results by the weight of the corresponding segmentation model, respectively, and summing multiplication results to acquire the segmentation weight value of the target segmentation position, the target segmentation position being any segmentation position in the segmentation positions.

In additional implementation, that the state value is 0, it indicates that no segmentation is performed at the corresponding segmentation position, and if that the state value is 1, it indicates that segmentation is performed at the corresponding segmentation position. Acquiring the segmentation probability of each segmentation position according to the state values corresponding to each segmentation position in the n segmentation sub-results can include averaging the state values corresponding to the target segmentation position in the n segmentation sub-results to acquire the segmentation probability of the target segmentation position. The target segmentation position is any segmentation position in the segmentation positions.

Also processing the segmentation probability of each segmentation position by the activation function in the result combination model to acquire the segmentation result of the text sequence can include binarizing the segmentation probability of each segmentation position by the activation function to acquire a binarized sequence of the text sequence, and acquiring the segmentation result of the text sequence according to the binarized sequence.

In another possible implementation manner, the method can further include training the segmentation model by the text sequence and the segmentation result of the text sequence.

In summary, in the technical solution according to the embodiment of the present disclosure, the same text sequence is segmented by a plurality of segmentation models to acquire n segmentation sub-results, state values corresponding to the each segmentation position in the n segmentation sub-results are combined to acquire a segmentation probability of each segmentation position in the text sequence, and then a segmentation result of the text sequence is determined in combination with the segmentation probability of the each segmentation position. That is, in the technical solutions, using each segmentation position in the text sequence as a unit, segmentation results of a plurality of segmentation models are combined, such that the accuracy of segmentation of a new text sequence is improved.

In addition, in the technical solution according to the embodiment of the present disclosure, the acquired text sequence and the segmentation result of the text segment may be further used as a training corpus of the segmentation model, such that a new training corpus to automatically expand of the segmentation model is achieved. Since the text sequence may be a new text sequence other than easy data augmentation for an existing training corpus, a training effect of an automatically annotated training corpus to the segmentation model is improved according to this technical solution.

Figure 2:
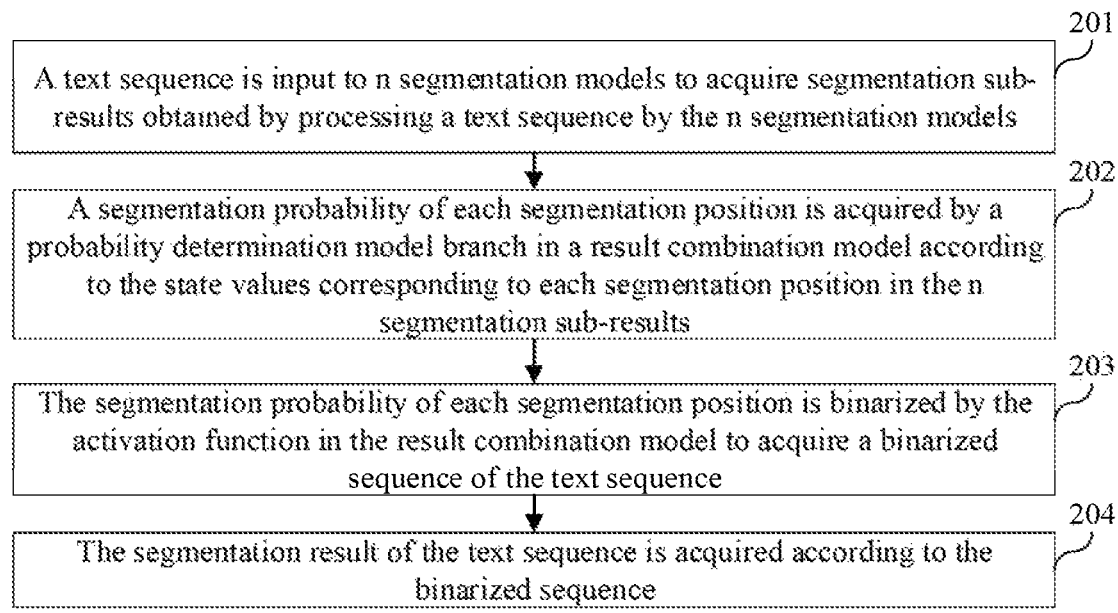
FIG. 2 is a flowchart of a text sequence segmentation method according to an exemplary embodiment of the present disclosure.

FIG. 2 is a flowchart of a text sequence segmentation method according to an exemplary embodiment. The text sequence segmentation method may be executed by a computer device. As illustrated in FIG. 2, the text sequence segmentation method may include the following steps.

In step 201, a text sequence is input to n segmentation models to acquire segmentation sub-results obtained by processing a text sequence by the n segmentation models. The variable n can be an integer greater than or equal to 2.

The segmentation sub-result indicates a segmentation state at each segmentation position in the text sequence. The segmentation position is a position between each two adjacent characters (for example, a character is a Chinese character, a number, a period, a comma, a colon, a semicolon, an exclamation mark or a question mark in Chinese) in the text sequence, and the segmentation state indicates whether segmentation is performed at a corresponding segmentation position.

Optionally, the segmentation sub-result includes a state value corresponding to each segmentation position in the text sequence, the state value being intended to indicate a segmentation state at a corresponding segmentation position. For example, in one possible implement, the segmentation states are classified into two types: one is segmentation, the other is non-segmentation; two types of the segmentation states may be represented by different state values; and correspondingly, the segmentation sub-result mentioned above may be a state value sequence, and each state value in the sequence corresponds to one position in the text sequence.

For example, if the text sequence is "What is the weather like today?" and the position between each two adjacent characters (for example, a character is a word, a period, a comma, a colon, a semicolon, an exclamation mark or a question mark in English) is one segmentation position, the text sequence mentioned above may include six segmentation positions, and furthermore, if the end position of the text sequence is also used as one segmentation position, the text sequence may include seven segmentation positions.

The state value of the segmentation state mentioned above may be represented as 0 or 1. For example, when the segmentation state at a segmentation position is the segmentation, the state value of the segmentation state at this segmentation position is 1; otherwise, if the segmentation state at this segmentation position is the non-segmentation, the state value of the segmentation state at this segmentation position is 0. Assuming that the segmentation sub-result obtained by segmentation of the text sequence mentioned above by a first segmentation model in the n segmentation models is "What is/the weather/like/today/?", then the segmentation sub-result may be represented in a sequence as [0, 1, 0, 1, 1, 1] or [0, 1, 0, 1, 1, 1, 1]. Correspondingly, assuming that a segmentation sub-result obtained by segmentation of the text sequence mentioned above by a second segmentation model in the n segmentation models is "What is/the weather/like today/?", then the segmentation sub-result may be represented in a sequence as [0, 1, 0, 1, 0, 1] or [0, 1, 0, 1, 0, 1, 1]. That is, the segmentation sub-results obtained by segmentation of a single text sequence by the n segmentation models respectively may be the same or different; and in addition, if two segmentation sub-results are different, it may indicate that the segmentation states at some segmentation positions in the two segmentation sub-results are different.

In step 202, a segmentation probability of each segmentation position is acquired by a probability determination model branch in a result combination model according to the state values corresponding to each segmentation position in the n segmentation sub-results. In the embodiment of the present disclosure, the segmentation probability of a corresponding segmentation position may be determined by calculating by the probability determination model branch in the result combination model according to the state values corresponding to each segmentation position in the n segmentation sub-results.

For example, assuming that the segmentation sub-result of the first segmentation model is [0, 1, 0, 1, 1, 1], and the segmentation sub-result of the second segmentation model is [0, 1, 0, 1, 0, 1], then for the first segmentation position, the state values of two segmentation sub-results are both 0, and the computer device may combine the state values of the first segmentation position in the two segmentation sub-results to acquire the segmentation probability of the first segmentation position in the text sequence. Similarly, the computer device may combine the state values of the second segmentation position (1 and 1) in the two segmentation sub-results to acquire the segmentation probability of the second segmentation position in the text sequence, and so on.

In one possible implementation, the steps of acquiring the segmentation probability of each segmentation position by the probability determination model branch according to the state values corresponding to each segmentation position in the n segmentation sub-results, and acquiring the segmentation result according to the segmentation probability may be performed by a pre-trained machine learning model. That is, the result combination model may be a model acquired by training according to a machine learning algorithm.

For example, the result combination model may be a machine learning model trained according to n segmentation sub-result samples of a text sequence sample and an annotation segmentation result of the text sequence sample, wherein the n segmentation sub-result samples are acquired by segmenting the text sequence sample by the n segmentation models.

In an additional example, in the training stage of the result combination model, the computer device may firstly acquire several text sequence samples with segmentation results annotated (which may be manually annotated), then respectively input the text sequence samples into the n segmentation models to acquire segmentation sub-result samples corresponding to the n segmentation sub-models, and combine the result combination models by the a segmentation sub-result samples and the annotated segmentation results of the text sequence samples.

Optionally, the result combination model may be a linear regression (LR) model, or may be a support vector machine (SVM) model, a decision tree model, or the like.

In one possible implementation, the probability determination model branch may include weights of the n segmentation models. That is, the weights of the n segmentation models are model parameters of the result combination model. In the process of acquiring the segmentation probability of each segmentation position by the probability determination model branch according to the state values corresponding to each segmentation position in the n segmentation sub-results, the computer device may acquire a segmentation weight value of the each segmentation position by the probability determination model branch according to the state values corresponding to each segmentation position in the n segmentation sub-results and the weights of the n segmentation models, and normalize the segmentation weight value of the each segmentation position by the probability determination model branch to acquire the segmentation probability of each segmentation position.

Since the n segmentation sub-results are input to the result combination model, different segmentation sub-results correspond to different segmentation models, and accuracies of different segmentation models are also different, in the embodiment of the present disclosure, a respective weight may be set for each segmentation model, and the weight may be determined by training the result combination model in advance. That is, the process of training the result combination model may include the training for the weight of each segmentation model.

Upon completion of the training of the weight of each segmentation model, the state values of a segmentation position in the results output by different segmentation models may be calculated by the weight of each segmentation model to acquire the segmentation weight value of the segmentation position, and then the segmentation weight value of each segmentation position is normalized such that the segmentation probability of each segmentation position is acquired.

Optionally, in the process of acquiring the segmentation weight value of the each segmentation position by the probability determination model branch according to the state values corresponding to each segmentation position in the n segmentation sub-results and the weights of the n segmentation models, the computer device may multiply each of the state values corresponding to a target segmentation position in the n segmentation sub-results by the weight of the corresponding segmentation model, respectively, and sum multiplication results to acquire the segmentation weight value of the target segmentation position, and the target segmentation position is any segmentation position in the segmentation positions.

The weight of the segmentation model may be a floating point in an interval (0, 1). For example, assuming that there are three segmentation models, the weights of these segmentation models are 0.2, 0.3, and 0.4, respectively, with respect to a segmentation position k in a text sequence, in the sub-results output by the three segmentation models respectively for the text sequence, state values corresponding to the segmentation position k are 1, 1, and 0 respectively; and with respect to a first segmentation position in the text sequence, in the sub-results output by the three segmentation models respectively for the text sequence, state values corresponding to the first segmentation position are respectively 0, 1, and 1, a segmentation weight value of the text sequence corresponding to the segmentation position k may be 1*0.2+1*0.3+0*0.4=0.5, and a segmentation weight value of the text sequence corresponding to the first segmentation position may be 0*0.2+1*0.3+1*0.4=0.7.

Since the length of the text sequence is fixed, and the segmentation position is also fixed, the number of state values in each segmentation sub-result is the same, and correspondingly, the number of the segmentation weight values acquired by calculation is also fixed. For example, assuming that there are six segmentation positions in a text sequence, then each segmentation sub-result of the text sequence is a state value sequence with a length of 6, and a calculation result of the segmentation weight value is also a segmentation weight value sequence with a length of 6.

In another possible implementation, the result combination model may be also a preset calculation model, and the calculation model is deemed as a calculation formula with preset parameters. For example, that the state value is 0 indicates that segmentation is not performed at the corresponding segmentation position, and that the state value is 1 indicates that segmentation is performed at the corresponding segmentation position. In this case, in the process of acquiring the segmentation probability of the each segmentation position according to the state values corresponding to each segmentation position in the n segmentation sub-results, the computer device may average the state values corresponding to the target segmentation position in the n segmentation sub-results to acquire the segmentation probability of the target segmentation position, wherein the target segmentation position is any segmentation position in the segmentation positions.

For example, with respect to a segmentation position k in a text sequence, in the sub-results output by the three segmentation models respectively for the text sequence, state values corresponding to the segmentation position k are respectively 1, 1, and 0; and with respect to a first segmentation position in the text sequence, in the sub-results of output by the three segmentation models respectively for the text sequence, state values corresponding to the segmentation position k are respectively 0, 1, and 1, the segmentation probability of the text sequence corresponding to the segmentation position k may be (1+1+0)/3=2/3, and the segmentation probability of the text sequence corresponding to the first segmentation position may be (0+1+1)/3=2/3.

In step 203, the segmentation probability of each segmentation position is binarized by the activation function in the result combination model to acquire a binarized sequence of the text sequence. The binarized sequence ay be a sequence having a length equal to the number of segmentation positions in the text sequence and having each sequence value therein corresponding to the segmentation state of a segmentation position.

In one possible implementation, in the process of binarizing the segmentation probability of each segmentation position by the activation function, a binarized threshold may be preset (0.3, 0.4, 0.5, 0.6 or 0.7 for example); if the segmentation probability of a segmentation position is less than the binarized threshold, the sequence value corresponding to the segmentation position in the binarized sequence is set as 0; and on the contrary, if the segmentation probability of a segmentation position is greater than or equal to the binarized threshold, the sequence value corresponding to the segmentation position in the binarized sequence is set as 1.

In step 204, the segmentation result of the text sequence is acquired according to the binarized sequence. Taking the case where the sequence value of the binarized sequence is 0 or 1 as an example, that a sequence value in the binarized sequence is 0 indicates that the segmentation position corresponding to the sequence value is not segmented in the segmentation result of the text sequence; and on the contrary, that a sequence value in the binarized sequence is 1 indicates that the segmentation is performed at the segmentation position corresponding to the sequence value in the segmentation result of the text sequence.

Optionally, in the embodiment of the present disclosure, upon acquiring a segmentation result of a text sequence, the computer device may train the segmentation model according to the text sequence and a segmentation result of the text sequence.

The computer device may use the segmentation result of the text sequence and the text sequence itself as a new training corpus to train the segmentation model. The segmentation model may be one or a plurality of segmentation models in the n segmentation models, or the segmentation model may be also other segmentation models except the n segmentation models. That is, in the technical solution according to the embodiment of the present disclosure, a new text sequence may be annotated automatically into a new training corpus of the segmentation model.

In summary, in the technical solution according to the embodiment of the present disclosure, the same text sequence is segmented by a plurality of segmentation models to acquire n segmentation sub-results, state values corresponding to the each segmentation position in the n segmentation sub-results are combined to acquire a segmentation probability of each segmentation position in the text sequence, and then a segmentation result of the text sequence is determined in combination with the segmentation probability of the each segmentation position. That is, in the technical solutions, using each segmentation position in the text sequence as a unit, segmentation results of a plurality of segmentation models are combined, such that the accuracy of segmentation of a new text sequence is improved.

In addition, in the technical solution according to the embodiment of the present disclosure, the acquired text sequence and the segmentation result of the text segment may be further used as a training corpus of the segmentation model, such that a new training corpus to automatically expand of the segmentation model is achieved. Since the text sequence may be a new text sequence other than easy data augmentation for an existing training corpus, a training effect of an automatically annotated training corpus to the segmentation model is improved according to this technical solution.

In addition, in the technical solution according to the embodiment of the present disclosure, in the process of combining the segmentation results obtained by a plurality of segmentation models, different weights are set for the segmentation sub-results output by different segmentation models, such that the accuracy of segmentation of a new text sequence is further improved.

The technical solution according to the above embodiment may be deemed as a segmentation corpus automatic annotation method based on partial voting, wherein a plurality of schedulable quality segmentation models according to related arts may be used to annotate a raw corpus (that is, a new text sequence), and then weighted votes are given (that is, combination according to the weights) to a plurality of annotation results (that is, the above segmentation sub-results) by a model fusion method.

Figure 3:
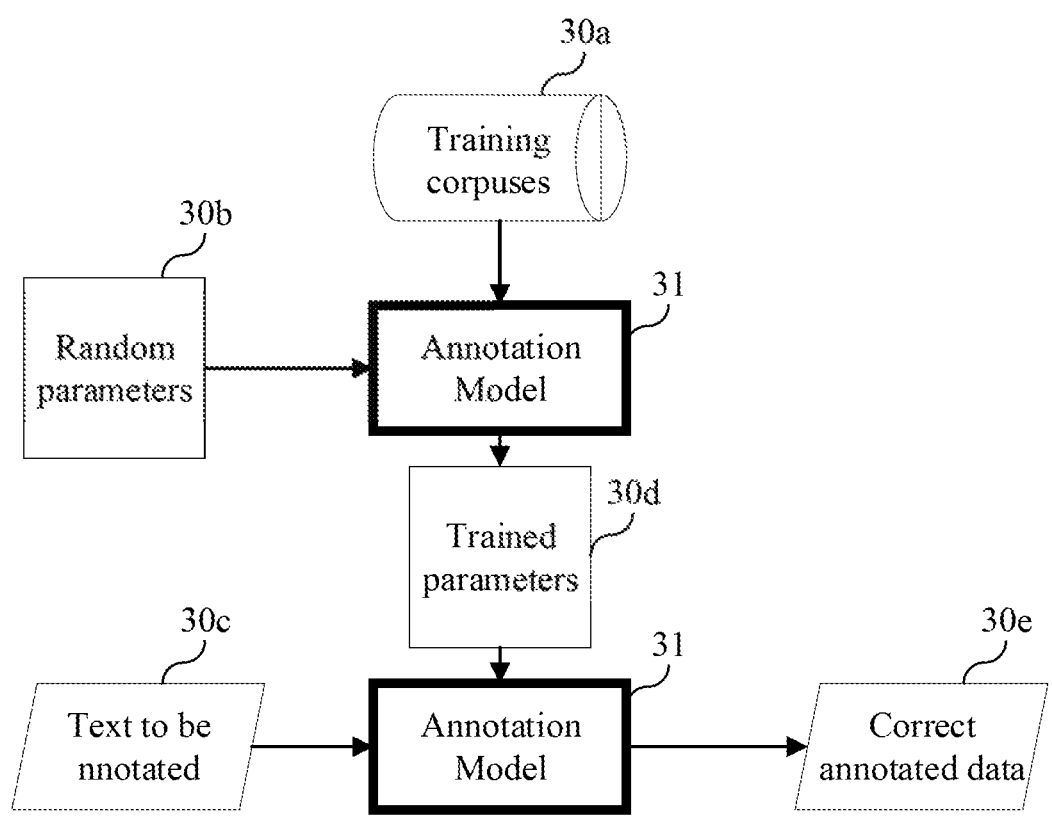
FIG. 3 is a schematic flowchart of model training and application according to an exemplary embodiment of the present disclosure.

Referring to FIG. 3, FIG. 3 is a schematic flowchart of model training and application according to an exemplary embodiment of the present disclosure. As illustrated in FIG. 3, firstly training corpuses 30a and initialized random parameters 30b are input to an annotation model 31, and parameters corresponding to various segmentation models are trained by linear regression. Upon completion of training, a text 30c to be annotated and trained parameters 30d are input to the annotation model 31, such that correct annotated data 30e is obtained.

Figure 4:
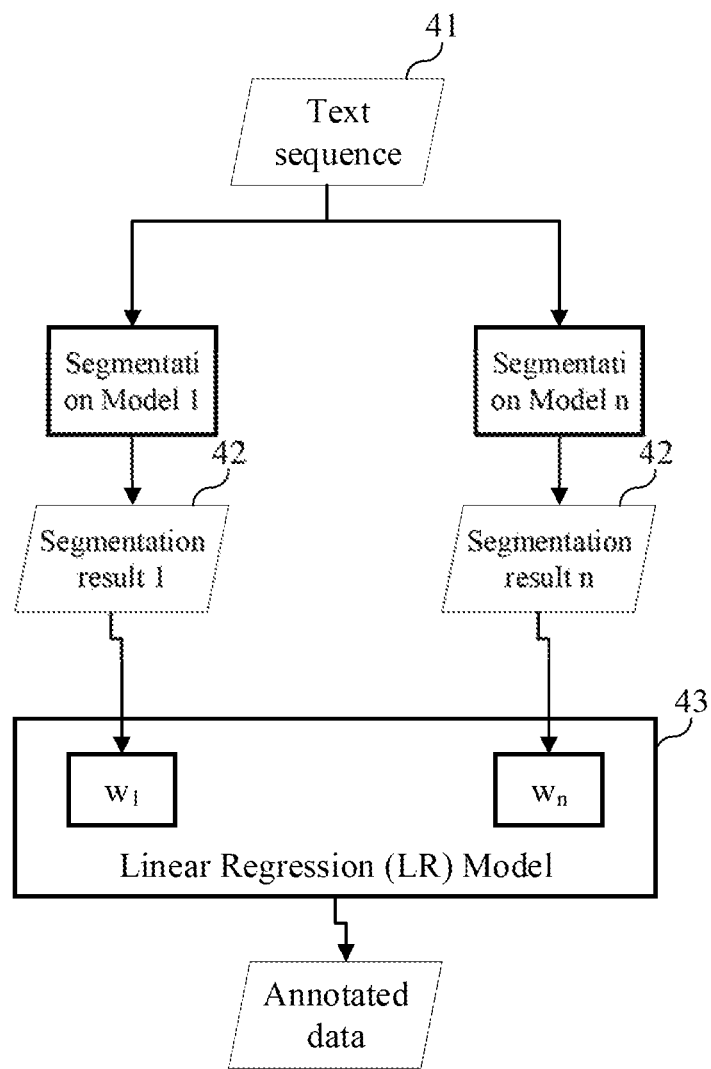
FIG. 4 is a schematic structural diagram of an annotation model involved in the embodiment as illustrated in FIG. 3.

Referring to FIG. 4, FIG. 4 is a structural diagram of an annotation model involved in the embodiment of the present disclosure. As illustrated in FIG. 4, model 1 to model N are trained segmentation models. When a text sequence 41 is input to a model i in the model 1 to model N, a segmentation result 42 (that is, an annotation result) corresponding to the model i may be generated. Assuming that "0" indicates segmentation and "1" indicates segmentation, then the annotation result may be converted to a 0-1 sequence having an equal length with the text. For example, the sequence may be a=[$a_0 a_1 \_ a_m$]. For example, upon segmentation of a text "What is the weather like today?", a segmentation result is "What is/the weather/like/today/?/", and the segmentation result may be represented as a 0-1 sequence [0, 1, 0, 1, 1, 1, 1].

A computer device multiplies the 0-1 sequence output by each of model 1 to model N by parameter $w_1$ (corresponding to $w_1$ to $w_n$ in FIG. 4) corresponding to each of the models, and multiplication results of the same segmentation position are summed by a linear regression (LR) model 43, such that a segmentation weight $c_j$ of each position in the text sequence is obtained.

$$c_j = \sum_{i=1}^{n} (w_i a_j)$$

In this case, a segmentation weight sequence c=[$c_0 c_1 \_ c_m$] of each segmentation position in the text sequence may be obtained.

The computer device then normalizes the segmentation weight of each segmentation position to obtain a segmentation probability $p_j$ corresponding to each segmentation position.

$$p_j = \frac{c_j}{\sum_{i=0}^{n} w_i}$$

A segmentation probability sequence p=[$p_0 p_1 \_ p_m$] corresponding to each position in the text sequence is obtained by the above formula. Then, the computer device inputs the segmentation probability to an activation function.

$$\mathrm{act}(x) = \begin{cases} 0 & x < 0.5 \\ 1 & x \geq 0.5 \end{cases}$$

A result obtained by the activation result is a corresponding 0-1 sequence (corresponding to the above binarized sequence).

By formula integration, a segmentation result sequence s may be represented as follows:

$$s = \text{act}\left(\frac{\sum_{i=0}^{n}(w_i a)}{\sum_{i=0}^{n} w_i}\right)$$

Based on the above technical solution according to the present disclosure, seven segmentation models whose effects are recognized in related arts are selected for voting (that is, result combination), and voting results are one by one compared with individual segmentation results, totally 400 modifications and corrections are randomly extracted from the inconsistent segmentation results upon votes comparison. Without considering the differences caused by segmentation standards, the results are as listed in Table 1.

TABLE 1

| Segmenter | Modifications | Corrections |
|---|---|---|
| Segmenter A | 83 | 8 |
| Segmenter B | 89 | 11 |
| Segmenter C | 69 | 9 |
| Segmenter D | 92 | 10 |
| Segmenter E | 96 | 11 |
| Segmenter F | 74 | 7 |
| Segmenter G | 71 | 10 |

As seen from Table 1, even in the case of poor voting results, 69 errors of the individual segmenters may also be corrected, and the number of introduced incorrect results is far less than the number of modifications. The experiment results show that the results obtained by the multi-model partial voting according to the embodiment of the present disclosure are much better than the segmentation results obtained by the individual segmenters.

The technical solution according to the present disclosure is based on a model fusion concept, and the segmentation sub-results obtained by a plurality of segmentation models may be fused and a segmentation result better than that obtained by any individual segmenter may be acquired. If the selected base model is an SOTA model, the acquired segmentation result may also be better than the SOTA model.

Different from a conventional fashion of expanding a training corpus by easy data augmentation, the method according to the present disclosure may introduce wholly new corpora, which relieves restrictions by vocabularies, sentences or the like in old and outdated corpora. In addition, as long as texts in source corpora comply with Chinese expression specifications, no concern may be placed on whether corpora failing to comply with the actual grammar scenarios are expanded as in the data augmentation. In summary, with corpora expansion by the technical solution according to the present disclosure, model learning may be more comprehensive, more extensive, and more realistic to the real application scenarios.

Figure 5:
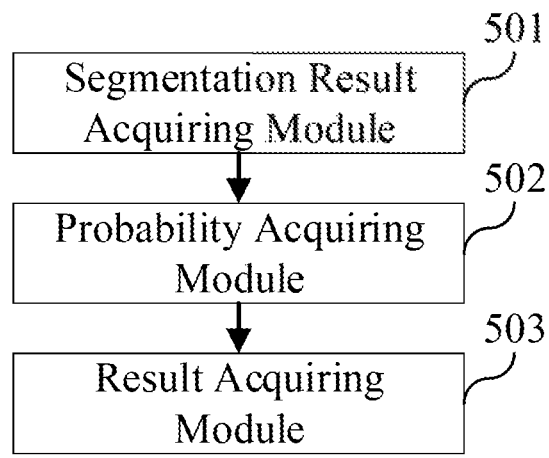
FIG. 5 is a block diagram of a text sequence segmentation apparatus according to an exemplary embodiment of the present disclosure.

FIG. 5 is a block diagram of a text sequence segmentation apparatus according to an exemplary embodiment of the present disclosure. As illustrated in FIG. 5, the text sequence segmentation apparatus may be practiced as an entirety or a portion of a computer device by hardware or a combination of software and hardware, to perform a part of or all of the steps in the embodiment as illustrated in FIG. 1 or FIG. 2. The text sequence segmentation apparatus may include a segmentation result acquiring module 501 that is configured to acquire a segmentation sub-results of the text sequence, the n segmentation sub-results being acquired by segmenting the text sequence by n segmentation models, the segmentation sub-result indicating a segmentation state at each segmentation position in the text sequence, the segmentation position being a position between each two adjacent characters in the text sequence, the segmentation state indicating whether segmentation is performed at a corresponding segmentation position, n being an integer greater than or equal to 2. Further, the apparatus can include a probability acquiring module 502 that is configured to process the n segmentation sub-results by a probability determination model branch in a result combination model to acquire a segmentation probability of each segmentation position, and a result acquiring module 503 that is configured to process the segmentation probability of each segmentation position by an activation function in the result combination model to acquire a segmentation result of the text sequence.

In a possible implementation, the segmentation sub-result includes a state value of each segmentation position in the text sequence, the state value being intended to indicate a segmentation state at a corresponding segmentation position, and the probability acquiring module 502 is configured to acquire the segmentation probability of each segmentation position by the probability determination model branch according to the state values corresponding to each segmentation position in the n segmentation sub-results.

In a possible implementation, the probability determination model branch includes weights of the n segmentation models. The probability acquiring module 502 can include a weighing sub-module that is configured to acquire a segmentation weight value of each segmentation position by the probability determination model branch according to the state values corresponding to each segmentation position in the n segmentation sub-results and the weights of the n segmentation models, and a normalizing sub-module that is configured to normalize the segmentation weight value of each segmentation position by the probability determination model branch to acquire the segmentation probability of each segmentation position. The result combination model is a machine learning model trained according to n segmentation sub-result samples of a text sequence sample and an annotation segmentation result of the text sequence sample, the n segmentation sub-result samples are acquired by segmenting the text sequence sample by the n segmentation models, and the weights of the n segmentation models are model parameters of the result combination model.

In a possible implementation, the weighing sub-module is further configured to multiply the state values corresponding to a target segmentation position in the n segmentation sub-results by the weight of the corresponding segmentation model, respectively, and sum multiplication results to acquire the segmentation weight value of the target segmentation position, the target segmentation position being any segmentation position in the segmentation positions.

In a possible implementation, that the state value is 0 indicates that no segmentation is performed at the corresponding segmentation position, and that the state value is 1 indicates that segmentation is performed at the corresponding segmentation position. Further, the probability acquiring module 502 can be further configured to average the state values corresponding to the target segmentation position in the n segmentation sub-results to acquire the segmentation probability of the target segmentation position, where the target segmentation position is any segmentation position in the segmentation positions.

In a possible implementation, the result acquiring module 503 further can further include a binarizing sub-module, configured to binarize the segmentation probability of each segmentation position by the activation function to acquire a binarized sequence of the text sequence, and a result acquiring sub-module, configured to acquire the segmentation result of the text sequence according to the binarized sequence.

In a possible implementation, the apparatus further includes a training module, configured to train the segmentation model by the text sequence and the segmentation result of the text sequence.

In summary, in exemplary technical solutions according to the embodiments of the present disclosure, the same text sequence can be segmented by a plurality of segmentation models to acquire n segmentation sub-results, state values corresponding to the each segmentation position in the n segmentation sub-results are combined to acquire a segmentation probability of each segmentation position in the text sequence, and then a segmentation result of the text sequence is determined in combination with the segmentation probability of the each segmentation position. That is, in the technical solutions, using each segmentation position in the text sequence as a unit, segmentation results of a plurality of segmentation models are combined, such that the accuracy of segmentation of a new text sequence is improved.

In addition, in the exemplary technical solutions according to the embodiments of the present disclosure, the acquired text sequence and the segmentation result of the text segment may be further used as a training corpus of the segmentation model, such that a new training corpus to automatically expand of the segmentation model is achieved. Since the text sequence may be a new text sequence other than easy data augmentation for an existing training corpus, a training effect of an automatically annotated training corpus to the segmentation model is improved according to this technical solution.

In addition, in the exemplary technical solutions according to the embodiments of the present disclosure, in the process of combining the segmentation results obtained by a plurality of segmentation models, different weights are set for the segmentation sub-results output by different segmentation models, such that the accuracy of segmentation of a new text sequence is further improved.

It should be noted that, during implementation of the functions of the apparatus according to the above embodiment, the apparatus is described by only using division of the above functional modules as examples. In practice, the functions may be assigned to different functional modules for implementation as required. To be specific, the internal structure of the apparatus is divided into different functional modules to implement all or part of the above-described functions.

With respect to the apparatus in the above embodiment, details about performing corresponding operations by different modules have been described in the method embodiment, which are not given herein any further.

An exemplary embodiment of the present disclosure provides a text sequence segmentation apparatus which is capable of performing all or a part of the steps in the embodiment as illustrated in FIG. 1 or FIG. 2. The apparatus may be applied to a computer device. The apparatus includes a processor and a memory for storing at least one executable instruction.

The processor can be configured to acquire n segmentation sub-results of the text sequence, the n segmentation sub-results being acquired by segmenting the text sequence by n segmentation models, the segmentation sub-result indicating a segmentation state at each segmentation position in the text sequence, the segmentation position being a position between each two adjacent characters in the text sequence, the segmentation state indicating whether segmentation is performed at a corresponding segmentation position, n being an integer greater than or equal to 2. Further, the processor can be configured to process the n segmentation sub-results by a probability determination model branch in a result combination model to acquire a segmentation probability of each segmentation position, and process the segmentation probability of each segmentation position by an activation function in the result combination model to acquire a segmentation result of the text sequence.

In a possible implementation, the segmentation sub-result includes a state value of each segmentation position in the text sequence, the state value being intended to indicate a segmentation state at a corresponding segmentation position. Processing the n segmentation sub-results by the probability determination model branch in the result combination model to acquire the segmentation probability of each segmentation position includes acquiring the segmentation probability of each segmentation position by the probability determination model branch according to the state values corresponding to each segmentation position in the n segmentation sub-results.

In a possible implementation, the probability determination model branch includes weights of the n segmentation models. Acquiring the segmentation probability of each segmentation position by the probability determination model branch according to the state values corresponding to each segmentation position in the n segmentation sub-results can include acquiring a segmentation weight value of each segmentation position by the probability determination model branch according to the state values corresponding to each segmentation position in the n segmentation sub-results and the weights of the n segmentation models, and normalizing the segmentation weight value of each segmentation position by the probability determination model branch to acquire the segmentation probability of each segmentation position. The result combination model is a machine learning model trained according to n segmentation sub-result samples of a text sequence sample and an annotation segmentation result of the text sequence sample, the n segmentation sub-result samples are acquired by segmenting the text sequence sample by the n segmentation models, and the weights of the n segmentation models are model parameters of the result combination model.

In a possible implementation, acquiring the segmentation weight value of each segmentation position by the probability determination model branch according to the state values corresponding to each segmentation position in the n segmentation sub-results and the weights of the n segmentation models can include multiplying each of the state values corresponding to a target segmentation position in the n segmentation sub-results by the weight of the corresponding segmentation model, respectively, and summing multiplication results to acquire the segmentation weight value of the target segmentation position, the target segmentation position being any segmentation position in the segmentation positions.

In a possible implementation, that the state value is 0 indicates that no segmentation is performed at the corresponding segmentation position, and that the state value is 1 indicates that segmentation is performed at the corresponding segmentation position. Further, acquiring the segmentation probability of each segmentation position according to the state values corresponding to each segmentation position in the n segmentation sub-results can include averaging the state values corresponding to the target segmentation position in the n segmentation sub-results to acquire the segmentation probability of the target segmentation position, where the target segmentation position is any segmentation position in the segmentation positions.

In a possible implementation, processing the segmentation probability of each segmentation position by the activation function in the result combination model to acquire the segmentation result of the text sequence includes binarizing the segmentation probability of each segmentation position by the activation function to acquire a binarized sequence of the text sequence, and acquiring the segmentation result of the text sequence according to the binarized sequence.

In a possible implementation, the processor is further configured to train the segmentation model by the text sequence and the segmentation result of the text sequence.

Figure 6:
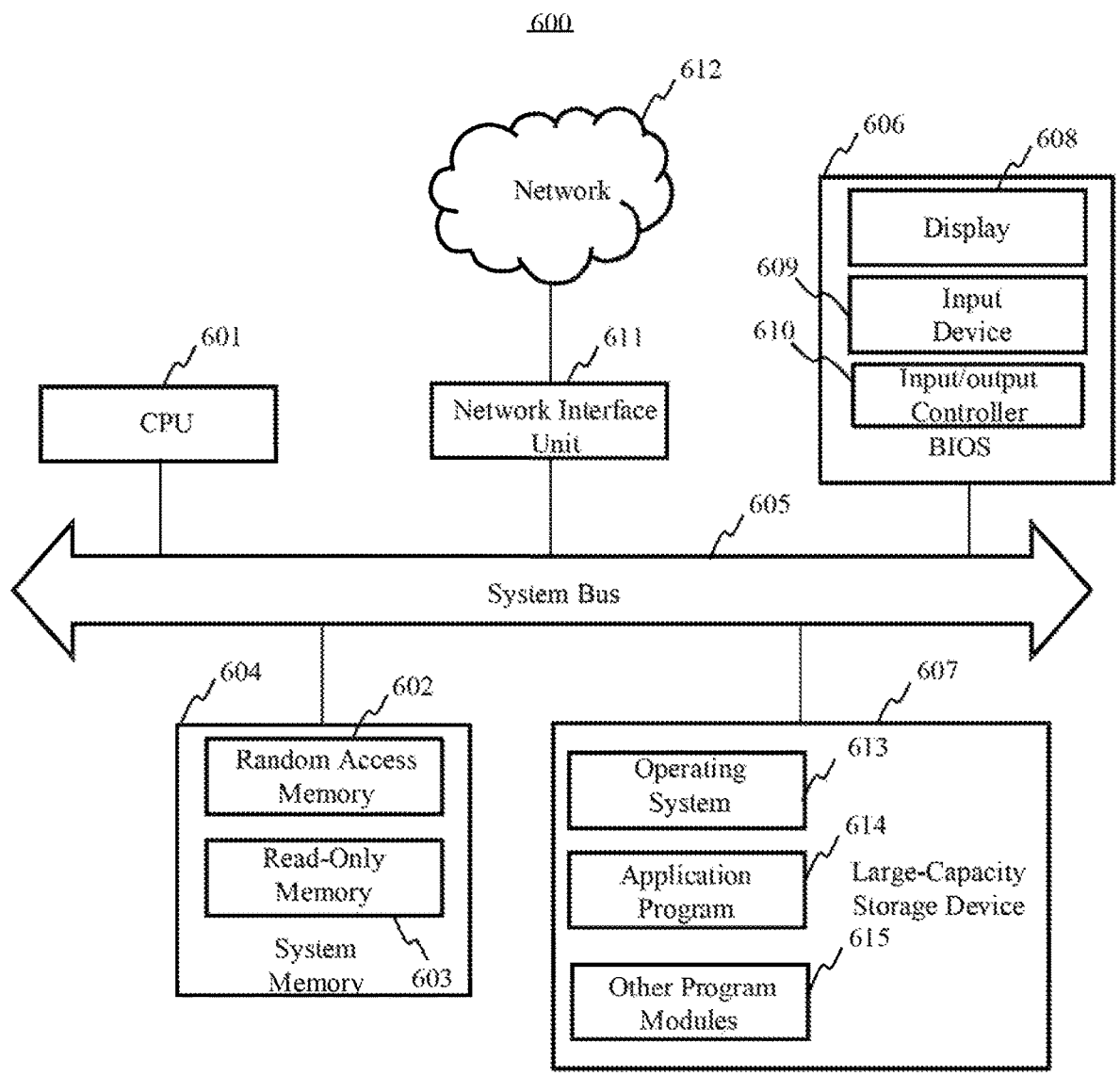
FIG. 6 is a schematic structural diagram of a computer device according to an exemplary embodiment of the present disclosure.

FIG. 6 is a schematic structural diagram of a computer device 600 according to an exemplary embodiment of the present disclosure. The computer device 600 includes a central processing unit (CPU) 601, a system memory 604 including a random access memory (RAM) 602 and a read-only memory (ROM) 603, and a system bus 605 communicatively connecting the system memory 604 and the CPU 601. The computer device 600 further includes a basic input/output system (BIOS) 606 for facilitating information transmission between various components within a computer, and a large-capacity storage device 607 for storing an operating system 613, an application program 614, and one or more other program modules 615.

The BIOS 606 includes a display 608 for displaying information, and an input device 609 such as a mouse and a keyboard, for information input by a user. The display 608 and the input device 609 are both communicatively connected to the CPU 601 via an input/output (I/O) controller 610 communicatively connected to the system bus 605. The BIOS 606 may further include the I/O controller 610 to receive and process inputs from such devices as a keyboard, a mouse, or an electronic stylus. Analogously, the I/O controller 610 further provides outputs to a display screen, a printer, or another type of output device.

The large-capacity storage device 607 is communicatively connected to the CPU 601 via a large-capacity storage controller (not illustrated in FIG. 5) communicatively connected to the system bus 605. The large-capacity storage device 607 and the non-transitory computer-readable storage medium associated therewith provide non-volatile storage for the computer device 600. To be specific, the large-capacity storage device 607 may include a non-transitory compute-readable storage medium (not illustrated in FIG. 6), for example, a hard disk or a CD-ROM driver.

Without loss of generality, the non-transitory computer-readable storage medium may include a computer storage medium and a communication medium. The computer storage medium includes a volatile and non-volatile, movable and unmovable medium that is implemented using any method and technology for storing information such as non-transitory computer-readable instructions, data structures, program modules, or other data. The non-transitory computer-readable medium includes a RAM, a ROM, an EPROM, an EEPROM, a flash memory, or another such solid storage technology-based storage device; a CD-ROM, a DVD, or another such optical storage device; and a data cartridge, a magnetic card, a magnetic tape, or another such magnetic storage device. Nevertheless, a person skilled in the art may know that the non-transitory computer-readable storage medium is not limited to what are listed above. The system memory 604 and the large-capacity storage device 607 may be uniformly referred to as a memory.

According to the embodiments of the present disclosure, the computer device 600 may be further communicatively connected to a remote computer on the network by using a network such as the Internet, and may run on the computer. To be specific, the computer device 600 may be communicatively connected to a network 611 via a network interface unit 612 communicatively connected to the system bus 605, or the computer device 500 may be communicatively connected to another type of network or a remote computer system (not illustrated in FIG. 6) via the network interface unit 611.

The memory further includes at least one program. The at least one program is stored in the memory. The CPU 601 performs a part of or all of the steps in the method as illustrated in FIG. 1 or FIG. 2 by running the at least one program.

A person skilled in the art may appreciate that in the above one or more examples, the functions according to the embodiments of the present disclosure may be implemented by hardware, software, firmware or any combination thereof. When the functions are implemented by hardware, these functions may be stored in a computer-readable storage medium and transmitted as one or a plurality of instructions or codes on the computer-readable storage medium. The computer-readable medium includes a computer storage medium and a communication medium. The communication medium includes any medium capable of transferring a computer program from one location to another. The storage medium may be any available medium that may be accessed by a general or dedicated computer.

An embodiment of the present disclosure further provides a non-transitory computer storage medium, configured to store at least one computer software instruction used by the above terminal, including the program for performing the above text sequence segmentation method.

Other embodiments of the present disclosure will be apparent to those skilled in the art from consideration of the specification and practice of the present disclosure. This application is intended to cover any variations, uses, or adaptations of the present disclosure following the general principles thereof and including common knowledge or commonly used technical measures which are not disclosed herein. The specification and embodiments are to be considered as exemplary only, with a true scope and spirit of the present disclosure is indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A text sequence segmentation method, comprising:
receiving an input text sequence and segmenting the text sequence by n segmentation models, respectively;
acquiring n segmentation sub-results of the text sequence, the segmentation sub-result indicating a segmentation state at each segmentation position in the text sequence, the segmentation position being a position between each two adjacent characters in the text sequence, the segmentation state indicating whether segmentation is performed at a corresponding segmentation position, where n is an integer greater than or equal to 2;

processing the n segmentation sub-results by a probability determination model branch in a result combination model to acquire a segmentation probability of each segmentation position; and processing the segmentation probability of each segmentation position by an activation function in the result combination model in order to acquire a segmentation result of the text sequence.

2. The method according to claim 1, wherein:
the segmentation sub-result further comprises a state value of each segmentation position in the text sequence, the state value indicating a segmentation state at a corresponding segmentation position, and
processing the n segmentation sub-results by the probability determination model branch in the result combination model to acquire the segmentation probability of each segmentation position further comprises acquiring the segmentation probability of each segmentation position by the probability determination model branch according to the state values corresponding to each segmentation position in the n segmentation sub-results.

3. The method according to claim 2, wherein the probability determination model branch includes weights of the n segmentation models, and acquiring the segmentation probability of each segmentation position by the probability determination model branch according to the state values corresponding to each segmentation position in the n segmentation sub-results further comprises:
acquiring a segmentation weight value of each segmentation position by the probability determination model branch according to the state values corresponding to each segmentation position in the n segmentation sub-results and the weights of the n segmentation models; and
normalizing the segmentation weight value of each segmentation position by the probability determination model branch to acquire the segmentation probability of each segmentation position,
wherein the result combination model is a machine learning model trained according to n segmentation sub-result samples of a text sequence sample and an annotation segmentation result of the text sequence sample, the n segmentation sub-result samples are acquired by segmenting the text sequence sample by the n segmentation models, and the weights of the n segmentation models are model parameters of the result combination model.

4. The method according to claim 3, wherein acquiring the segmentation weight value of each segmentation position by the probability determination model branch according to the state values corresponding to each segmentation position in the n segmentation sub-results and the weights of the n segmentation models further comprises:
multiplying each of the state values corresponding to a target segmentation position in the n segmentation sub-results by the weight of the corresponding segmentation model, respectively, and summing multiplication results to acquire the segmentation weight value of the target segmentation position, the target segmentation position being any segmentation position in the segmentation positions.

5. The method according to claim 2, wherein the state value of 0 indicates that no segmentation is performed at the corresponding segmentation position, and that the state value of 1 indicates that segmentation is performed at the corresponding segmentation position, and acquiring the segmentation probability of each segmentation position according to the state values corresponding to each segmentation position in the n segmentation sub-results further comprises:
averaging the state values corresponding to the target segmentation position in the n segmentation sub-results to acquire the segmentation probability of the target segmentation position, wherein the target segmentation position is any segmentation position in the segmentation positions.

6. The method according to claim 1, wherein processing the segmentation probability of each segmentation position by the activation function in the result combination model to acquire the segmentation result of the text sequence further comprises:
binarizing the segmentation probability of each segmentation position by the activation function to acquire a binarized sequence of the text sequence; and
acquiring the segmentation result of the text sequence according to the binarized sequence.

7. The method according to claim 1, further comprising:
training the segmentation model by the text sequence and the segmentation result of the text sequence.

8. A text sequence segmentation apparatus, comprising:
a segmentation result acquiring module that is configured to acquire n segmentation sub-results of the text sequence, the n segmentation sub-results being acquired by segmenting the text sequence by n segmentation models, the segmentation sub-result indicating a segmentation state at each segmentation position in the text sequence, the segmentation position being a position between each two adjacent characters in the text sequence, the segmentation state indicating whether segmentation is performed at a corresponding segmentation position, where n is an integer greater than or equal to 2;
a probability acquiring module that is configured to process the n segmentation sub-results by a probability determination model branch in a result combination model to acquire a segmentation probability of each segmentation position; and
a result acquiring module that is configured to process the segmentation probability of each segmentation position by an activation function in the result combination model to acquire a segmentation result of the text sequence.

9. The apparatus according to claim 8, wherein:
the segmentation sub-result further comprises a state value of each segmentation position in the text sequence, the state value being intended to indicate a segmentation state at a corresponding segmentation position, and
the probability acquiring module is configured to acquire the segmentation probability of each segmentation position by the probability determination model branch according to the state values corresponding to each segmentation position in the n segmentation sub-results.

10. The apparatus according to claim 9, wherein the probability determination model branch includes weights of the n segmentation models and the probability acquiring module further comprises:
a weighing sub-module that is configured to acquire a segmentation weight value of each segmentation position by the probability determination model branch according to the state values corresponding to each segmentation position in the n segmentation sub-results and the weights of the n segmentation models; and a normalizing sub-module that is configured to normalize the segmentation weight value of each segmentation position by the probability determination model branch to acquire the segmentation probability of each segmentation position, wherein the result combination model is a machine learning model trained according to n segmentation sub-result samples of a text sequence sample and an annotation segmentation result of the text sequence sample, the n segmentation sub-result samples are acquired by segmenting the text sequence sample by the n segmentation models, and the weights of the n segmentation models are model parameters of the result combination model.

11. The apparatus according to claim 10, wherein
the weighing sub-module is further configured to multiply the state values corresponding to a target segmentation position in the n segmentation sub-results by the weight of the corresponding segmentation model, respectively, and sum multiplication results to acquire the segmentation weight value of the target segmentation position, the target segmentation position being any segmentation position in the segmentation positions.

12. The apparatus according to claim 9, wherein the state value of 0 indicates that no segmentation is performed at the corresponding segmentation position, and the state value of 1 indicates that segmentation is performed at the corresponding segmentation position; and the probability acquiring module is further configured to average the state values corresponding to the target segmentation position in the n segmentation sub-results to acquire the segmentation probability of the target segmentation position, wherein the target segmentation position is any segmentation position in the segmentation positions.

13. The apparatus according to claim 8, wherein the result acquiring module further comprises:
a binarizing sub-module that is configured to binarize the segmentation probability of each segmentation position by the activation function to acquire a binarized sequence of the text sequence; and
a result acquiring sub-module that is configured to acquire the segmentation result of the text sequence according to the binarized sequence.

14. The apparatus according to claim 8, further comprising:
a training module that is configured to train the segmentation model by the text sequence and the segmentation result of the text sequence.

15. A text sequence segmentation device, comprising:
a processor, and
a memory that is configured to store at least one instruction which is capable of being executed by the processor,
wherein the processor is configured to:
receive an input text sequence and segment the text sequence by n segmentation models, respectively,
acquire n segmentation sub-results of the text sequence, the segmentation sub-result indicating a segmentation state at each segmentation position in the text sequence, the segmentation position being a position between each two adjacent characters in the text sequence, the segmentation state indicating whether segmentation is performed at a corresponding segmentation position, where n is an integer greater than or equal to 2, process the n segmentation sub-results by a probability determination model branch in a result combination model to acquire a segmentation probability of each segmentation position, and
process the segmentation probability of each segmentation position by an activation function in the result combination model to acquire a segmentation result of the text sequence.

16. The device according to claim 15, wherein the segmentation sub-result includes a state value of each segmentation position in the text sequence, the state value being intended to indicate a segmentation state at a corresponding segmentation position, and processing the n segmentation sub-results by the probability determination model branch in the result combination model to acquire the segmentation probability of each segmentation position further comprises:
acquiring the segmentation probability of each segmentation position by the probability determination model branch according to the state values corresponding to each segmentation position in the n segmentation sub-results.

17. The device according to claim 16, wherein the probability determination model branch includes weights of the n segmentation models, and acquiring the segmentation probability of each segmentation position by the probability determination model branch according to the state values corresponding to each segmentation position in the n segmentation sub-results further comprises:
acquiring a segmentation weight value of each segmentation position by the probability determination model branch according to the state values corresponding to each segmentation position in the n segmentation sub-results and the weights of the n segmentation models; and
normalizing the segmentation weight value of each segmentation position by the probability determination model branch to acquire the segmentation probability of each segmentation position,
wherein the result combination model is a machine learning model trained according to n segmentation sub-result samples of a text sequence sample and an annotation segmentation result of the text sequence sample, the n segmentation sub-result samples are acquired by segmenting the text sequence sample by the n segmentation models, and the weights of the n segmentation models are model parameters of the result combination model.

18. The device according to claim 17, wherein acquiring the segmentation weight value of each segmentation position by the probability determination model branch according to the state values corresponding to each segmentation position in the n segmentation sub-results and the weights of the n segmentation models further comprises:
multiplying each of the state values corresponding to a target segmentation position in the n segmentation sub-results by the weight of the corresponding segmentation model, respectively, and summing multiplication results to acquire the segmentation weight value of the target segmentation position, the target segmentation position being any segmentation position in the segmentation positions.

19. The device according to claim 16, wherein the state value of 0 indicates that no segmentation is performed at the corresponding segmentation position, and the state value of 1 indicates that segmentation is performed at the corresponding segmentation position, and acquiring the segmentation probability of each segmentation position according to the state values corresponding to each segmentation position in the n segmentation sub-results further comprises:
    averaging the state values corresponding to the target segmentation position in the n segmentation sub-results to acquire the segmentation probability of the target segmentation position, wherein the target segmentation position is any segmentation position in the segmentation positions.

20. A non-transitory computer-readable storage medium, wherein the storage medium stores at least one executable instruction, and a processor in a terminal is capable of performing the text sequence segmentation method according to claim 1 when the at least one executable instruction is executed by the processor.

* * * * *